(No Model.)

C. E. RIFE.
PULVERIZER AND STALK CUTTER.

No. 489,690. Patented Jan. 10, 1893.

Witnesses:
Inventor:
C. E. Rife
attys.

UNITED STATES PATENT OFFICE.

CHARLES E. RIFE, OF CHANDLER, MISSOURI.

PULVERIZER AND STALK-CUTTER.

SPECIFICATION forming part of Letters Patent No. 489,690, dated January 10, 1893.

Application filed November 9, 1891. Serial No. 411,359. (No model.)

*To all whom it may concern:*

Be it known that I, CHARLES E. RIFE, of Chandler, Clay county, Missouri, have invented certain new and useful Improvements in Pulverizers and Stalk-Cutters, of which the following is a full, clear, and exact description, reference being had to the accompanying drawings, forming a part hereof.

My invention relates to that class of agricultural implements which are designed to cut standing corn-stalks or canes in the field, for pulverizing the ground, for various agricultural purposes, and for rolling the ground, for crushing clods, and for similar purposes.

The objects of my invention are to produce an agricultural implement of this class which shall be simple, strong, durable, and inexpensive in construction and of light draft, and which shall be rapid and effective in its operation, and also under perfect control of an attendant. Furthermore, to produce a machine which can be easily and quickly adjusted either for work or for transportation; the working parts being adapted to be lifted entirely out of contact with the ground during transportation, and the carrying devices being so adjusted as in no way to interfere with the working parts of the machine while the latter are in operation.

To the above purposes, my invention consists in certain peculiar and novel features of construction and arrangement, as hereinafter described and claimed.

Figure 1:
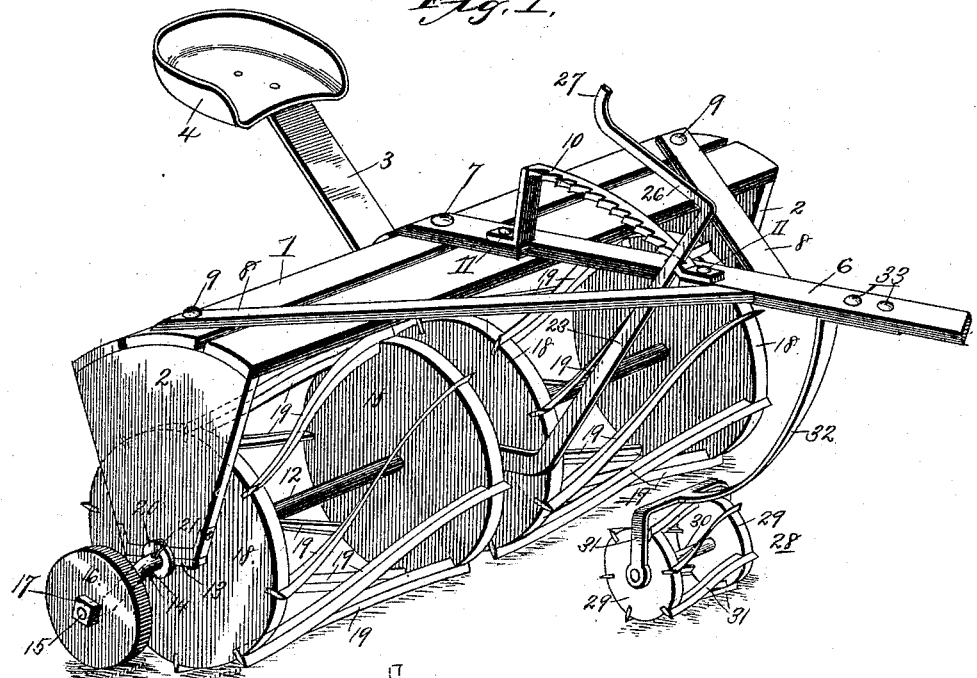
Figures 2, 3:
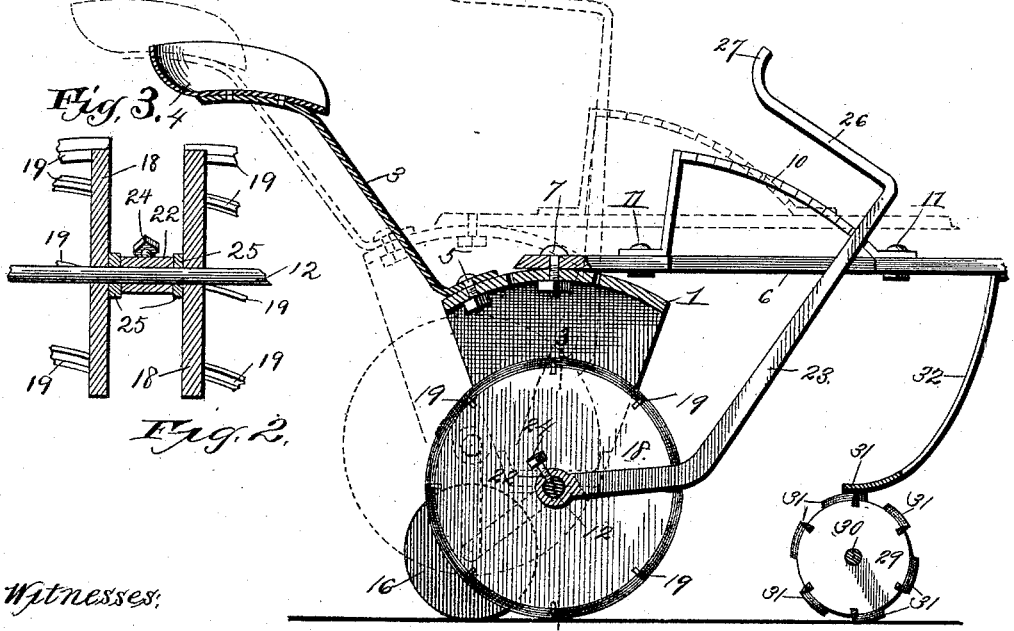

In order that my invention may be fully understood, I will proceed to describe it with reference to the accompanying drawings, in which:

Figure 1 is a perspective view of my improved machine; the parts being adjusted for work as a corn-stalk cutter and land pulverizer. Fig. 2 is a transverse vertical section of the same, the line of section being through the middle of the machine. Fig. 3 is a detached view, partly in front elevation and partly in transverse vertical section, of the two inner cutter-carrying disks, the central portion of the main axle, and adjacent parts of the cutters.

In the said drawings, 1 designates the frame or platform of my improved machine, the said platform being preferably composed of any suitable number of parallel boards or timbers extending from side to side of the machine and bolted or otherwise strongly secured at their ends to the upper edges of two vertical side-pieces or standards 2. Each of these standards 2 is preferably of approximately polygonal form, the lower margin of each standard being of straight horizontal form, while its front and rear margins diverge upwardly and forwardly and rearwardly respectively, while its upper edge is of segmental form. It is to be understood, however, that while this precise described form of the standards 2 is that which is preferred by me, such form may be varied as desired without departing from the essential spirit of my invention.

3 designates the standard for the driver's seat 4, said seat being bolted or otherwise suitably secured upon the upper end of said standard, and the lower end of the standard being secured by a bolt 5, or in other suitable manner to the rear of the platform 1 preferably at the middle of the same; and the arrangement being such that the standard projects obliquely upward and rearward from the rear of the machine, as shown.

6 designates the tongue of the machine, to which the draft-animals are to be harnessed in any suitable or preferred manner. The rear end of this tongue is rigidly secured to the platform 1, at the middle thereof, by any suitable or desired number of bolts 7, and the said tongue is braced laterally by two oppositely disposed braces 8, each of which extends obliquely outward and rearward from the rear part of the tongue to the ends of the platform 1; the rear ends of said braces being secured to the ends of the platform by any suitable number of bolts 9, or equivalent means, and the front ends of said braces being bolted or otherwise suitably secured to the tongue. Upon the rear part of the tongue 6 is also mounted a rack 10 which is of preferably approximately L-shape as shown, and the ends of which are secured by bolts 11, or equivalent means, to the upper side of the tongue; the teeth of the rack being formed upon one side of its oblique arm, and the rear arm of said rack extending vertically upward from the tongue, as shown. The purpose of this rack will be hereinafter explained.

12 designates the main axle of the machine, the said axle being of such length as to extend from end to end of the machine and also of such length as to extend at its outer portions through bearings 13 which are detachably secured to the lower edges of the standards 2. The outer ends of this axle are each formed with a crank-arm 14 which is provided at its outer extremity with a horizontal outwardly extending spindle 15 upon which is mounted a carrying-wheel 16; the said carrying-wheels being retained upon the spindles 15 by nuts 17, or by linch-pins, or other equivalent devices. The length of each of these crank-arms 14 is such that when said arms are moved into vertical position, as shown in dotted lines in Fig. 2 (and by the means hereinafter described) the entire frame-work of the machine shall be raised and the cutting and pulverizing devices, hereinafter described, lifted vertically out of contact with the ground, as is also indicated in dotted lines in Fig. 2. It is to be understood that this main axle does not revolve completely in its bearings 13 but has only the oscillatory movements just described. Upon this axle 12 are mounted four disks 18, which are arranged to revolve upon the axle and which are connected together in two pairs by two sets of cutting blades or knives 19; each pair of disks 18 and its set of cutters 19 being located at one side of the middle of the axle 12 and the two inner disks of each set being slightly separated from each other, as shown. Each of the cutting blades or knives 19 is of spiral form longitudinally and the ends of said blades are mortised into or otherwise suitably secured to the peripheries of the disks 18, the said cutters extending longitudinally from one disk to the companion disk, as shown. The axle 12 is retained in proper working position by two washers 20 which surround the axle at the point of union of its outer ends with the inner ends of the crank-arms 14; the said washers abutting against the outer sides of the standards 2, and being retained in position by linch pins 21 or other equivalent means, the linch pins passing through the axle outside of the washers. Between the two inner disks 18, the axle 12 is surrounded by the hub 22 of an adjusting-lever 23, the said hub being rigidly secured to the shaft by a set-bolt 24, or equivalent means, so that the axle shall turn with the hub when the lever 23 is moved.

In order to lessen the wear upon the ends of the hub 22, due to the revolving movements of the disks 18, a pair of washers 25 is provided, the said washers surrounding the shaft 12 and being interposed between the ends of the hub and the inner sides of the two inner disks 18. The lever 23 is of approximately L-form, the hub 22 being formed upon the rear end of its shorter arm and the longer arm extending upward beside the rack 10 so as to engage the teeth thereof. The upper end of the longer arm of this lever is provided with a rearward extension 26 the rear end of which is provided with a handle 27 which extends to within convenient reach of the driver when seated upon the seat 4.

From the above description, it will be seen that when the machine is being transported to or from its work, the lever 23 is to be drawn rearward, as indicated in dotted lines in Fig. 2, thus bringing the crank-arms 14 into vertical position, and raising the entire frame-work vertically and lifting the disks 18 and their cutters 19 entirely off the ground, as is also indicated by dotted lines in Fig. 2. When the machine is being thus transported, its weight is borne by the carrying wheels 16 and the engagement of the lever 23 with the upper or rear teeth of the rack 10 retains the machine in its required elevated position. When the machine is at work, the lever 23 is thrown forward, as shown in solid lines in Figs. 1 and 2, thus inclining the crank-arms 14 rearwardly and throwing the carrying-wheels 16 rearward and upward out of contact with the ground and out of the way of the cutters and disks.

The machine may be made of any suitable or preferred length so as to embrace three rows of stalks or canes at a time, and in order to avoid any possibility of any of the stalks or canes passing between the two inner disks 18, and thus failing to be cut, I have shown an auxiliary cutter 28 which is placed in advance of the two sets of cutters 19, and in line with the space between the two inner disks 18. This auxiliary cutter is composed, preferably, of two small disks 29 mounted to turn either upon or with a short axle 30 and connected together by a suitable number of spiral-cutting blades, 31 resembling the blades 19 but much shorter, and also mortised or otherwise secured at their ends to the peripheries of the disks 29. The ends of the axle 30 enter the ends of a forked standard 31$^a$, and said standard is carried upon the lower end of an arm 32 which extends upward and forward and the upper end of which is secured to the rear part of the tongue 6 by bolts 33 or other equivalent means. It is to be understood that the machine may be provided with this auxiliary cutter, or that said cutter may be dispensed with if desired; the space between the inner disks 18 being ordinarily so slight as to prevent the passage of any stalks between said disks. It is to be further observed that the peculiar spiral curvature of the blades 19 causes the blades to operate upon the stalks with a shearing cut, so as to effectively sever the stalks from their butts, and that this peculiar form of the cutting blades enables them to enter obliquely into the ground and thus thoroughly pulverize the same.

From the above description, it will be seen that I have produced a machine which is simple, strong, durable, and inexpensive in construction, which is easily controlled by the operator, and which is rapid and efficient in its operation, and furthermore, neither adjustment of which impedes the required action of the machine.

Having thus described my invention, what I claim as new therein and desire to secure by Letters Patent, is:—

A pulverizer, and stalk-cutter, comprising a platform, having vertical pendent standards at its ends, removable bearings secured to the lower ends of said standards, a seat standard secured to the platform, a tongue also secured to the platform and having braces connecting it laterally with the platform, a rocking axle having crank arms at its outer ends and journaled in said bearings, carrying wheels mounted upon the outer ends of said crank-arms, a rigid lever carried by said axle, and engaging a rack upon the tongue, and disks mounted upon the axle so as to turn thereon and provided with spiral connecting cutter blades, substantially as set forth.

In testimony whereof I affix my signature in the presence of two witnesses.

CHARLES E. RIFE.

Witnesses:
H. E. PRICE,
JNO. L. CONDRON.